United States Patent
Livescu et al.

(10) Patent No.: US 9,631,478 B2
(45) Date of Patent: Apr. 25, 2017

(54) REAL-TIME DATA ACQUISITION AND INTERPRETATION FOR COILED TUBING FLUID INJECTION OPERATIONS

(71) Applicant: Baker Hughes Incorporated, Houston, TX (US)

(72) Inventors: Silviu Livescu, Calgary (CA); D. V. Satyanarayana Gupta, The Woodlands, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 0 days.

(21) Appl. No.: 14/925,659

(22) Filed: Oct. 28, 2015

(65) Prior Publication Data

US 2016/0047230 A1  Feb. 18, 2016

Related U.S. Application Data

(63) Continuation-in-part of application No. 14/088,966, filed on Nov. 25, 2013.

(51) Int. Cl.
  *E21B 47/06* (2012.01)
  *C09K 8/80* (2006.01)
  *C09K 8/72* (2006.01)
  *E21B 43/26* (2006.01)
  *E21B 41/00* (2006.01)

(52) U.S. Cl.
  CPC .............. *E21B 47/065* (2013.01); *C09K 8/72* (2013.01); *C09K 8/80* (2013.01); *E21B 41/0078* (2013.01); *E21B 43/26* (2013.01); *E21B 47/06* (2013.01)

(58) Field of Classification Search
  CPC ....... E21B 47/065; E21B 47/121; E21B 49/008
  USPC ........................................... 166/250.01
  See application file for complete search history.

(56) References Cited

U.S. PATENT DOCUMENTS

| 6,874,361 | B1* | 4/2005 | Meltz | E21B 43/14 73/152.32 |
| 8,113,284 | B2* | 2/2012 | Jee | C12N 13/00 166/250.01 |
| 2010/0148785 | A1 | 6/2010 | Shaefer et al. | |
| 2010/0230105 | A1* | 9/2010 | Vaynshteyn | E21B 47/04 166/297 |

FOREIGN PATENT DOCUMENTS

WO   2013/085479 A1   6/2013

OTHER PUBLICATIONS

Livescu et al., "Analytical Downhole Temperature Model for Coiled Tubing Operations," SPE 168299 (2014), 17 pages.

* cited by examiner

*Primary Examiner* — Doug Hutton, Jr.
*Assistant Examiner* — Ashih Varma
(74) *Attorney, Agent, or Firm* — Shawn Hunter

(57) ABSTRACT

Methods for acquiring and interpreting operating parameter data during an operation to inject a work fluid into a wellbore.

19 Claims, 7 Drawing Sheets

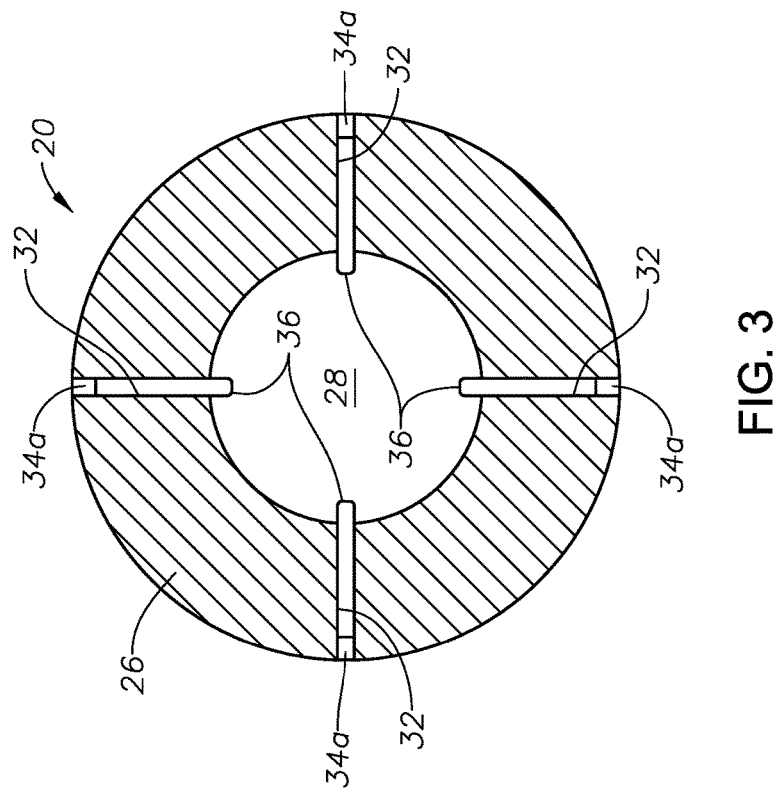
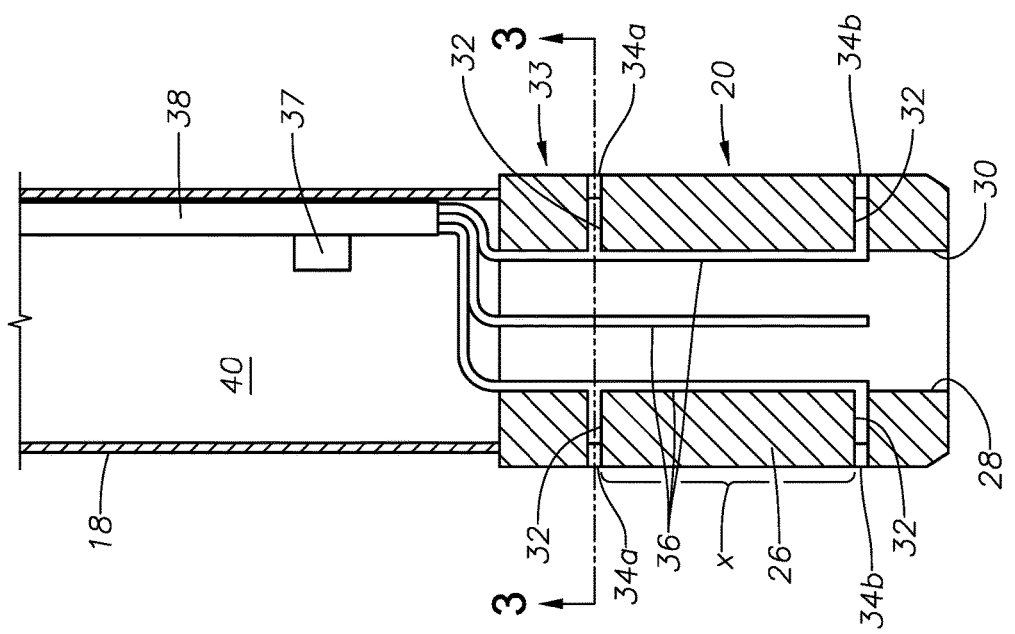

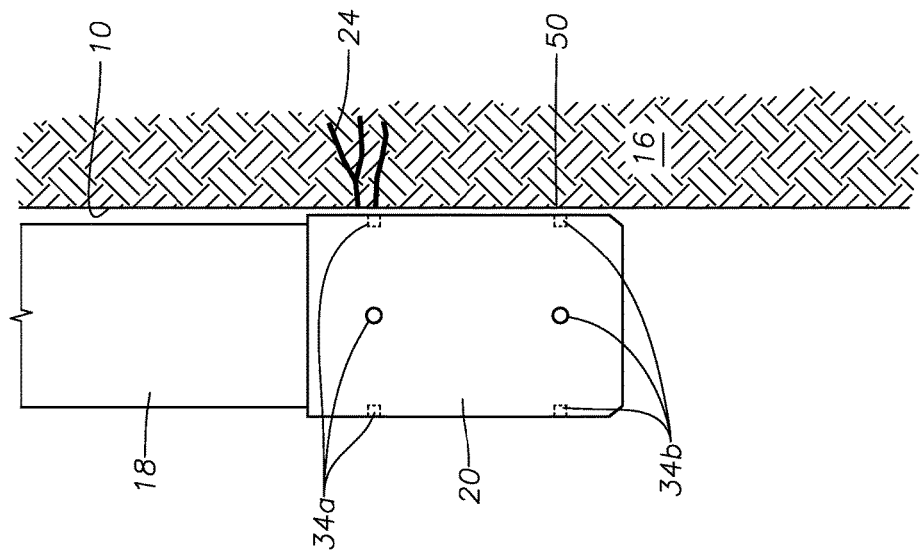
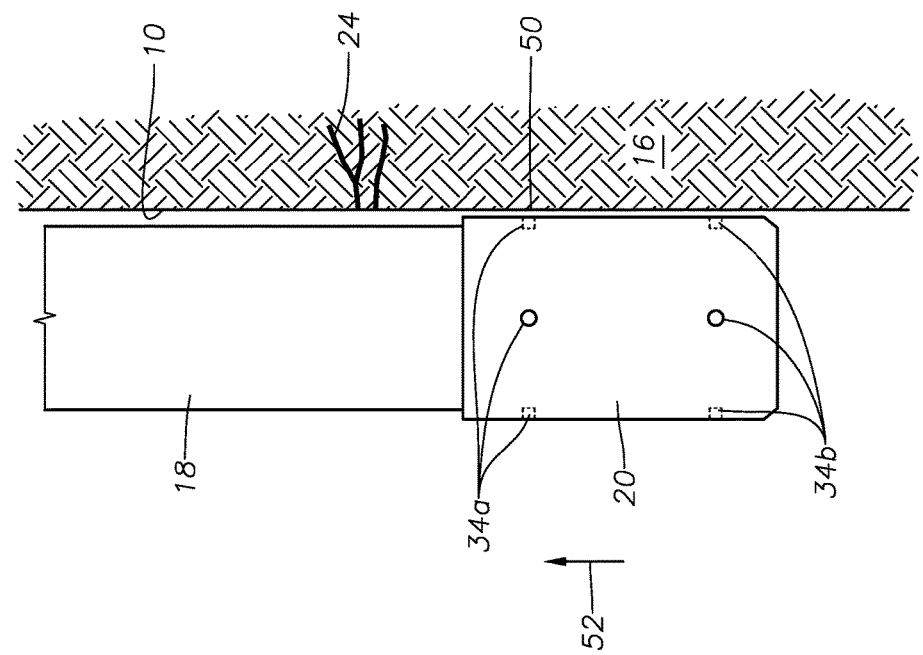

REAL-TIME DATA ACQUISITION AND INTERPRETATION FOR COILED TUBING FLUID INJECTION OPERATIONS

BACKGROUND OF THE INVENTION

1. Field of the Invention

The invention relates generally to data acquisition and interpretation of data for subterranean acidizing operations. In other aspects, the invention relates to data acquisition and interpretation for subterranean fracturing operations.

2. Description of the Related Art

Matrix acidizing is a stimulation process wherein acid is injected into a wellbore to penetrate rock pores. Matrix acidizing is a method applied for removing formation damage from pore plugging caused by mineral deposition. The acids, usually inorganic acids, such as fluoridic (HF) and or cloridic (HCl) acids, are pumped into the formation at or below the formation fracturing pressure in order to dissolve the mineral particles by chemical reactions. The acid creates high-permeability, high productivity flow channels called wormholes and bypasses the near-wellbore damage. The operation time depends on such parameters as the length of the wellbore, the rock type, severity of the damage, acid pumping rate, downhole conditions and other factors.

Matrix acidizing is also useful for stimulating both sandstone and carbonate reservoirs. Matrix acidizing efficiency in removing the formation damage is strongly dependent on the temperature at which the acidizing occurs and weakly dependent upon the corresponding pressure. The acid temperature in the formation depends on the convective heat transfer as the acid flows through the formation and on the reaction heat transfer due to the acid-mineral reaction.

Convective heat transfer is the main mechanism for temperature change during acid flow through wormholes. The acid temperature in the wormholes may vary by as much as 10-20° C. (18-36° F.), or more, depending on the initial temperature difference between wellbore and the formation. The acid temperature at the end of the wormholes, about 1-10 m (3.3-33 feet) from the wellbore, may increase, for example, by 1°-5° C. (1.8°-8° F.) above the formation temperature at those locations, depending on the injected acid volume.

Along a wormhole, the temperature changes over time as illustrated by FIG. 4. Initially, the temperature near the wellbore is the acid temperature inside the well ($T_w$ at t=0). The rest of the wormhole, which may be partially or totally undeveloped, is assumed to be at the formation or reservoir temperature ($T_r$ at t=0), which is greater than the wellbore temperature. As time progresses and acid is injected through the wormhole, at small radial distances near the wellbore (up to about 1 m (3.3 feet)), the acid temperature decreases from $T_r$ to $T_w$ with time at a rate depending upon the temperature drop of the fluid flowing from the wellbore. In other words, in the near well region, the temperature behavior depends only on the convection heat transfer due to the acid flow through the wormhole.

A diversion technique is important to success of matrix acidizing. In a diversion technique, diverter fluid is pumped into the wellbore prior to injection of acid. Optimum acid placement is also important. Stimulation efficiency depends to a great deal upon temperature. Temperature will accelerate or decelerate the chemical reactions and, thus, impact the acid volumes and flow rates required for an optimal treatment.

Prior art techniques for obtaining temperature data during acidizing have sought to provide such data in "real time." In most cases, a distributed temperature sensing ("DTS") fiber is inserted into coiled tubing which is then run into the wellbore. A DTS fiber is an optic fiber having sensors along its length. The acid is bullheaded, and the DTS-enabled coiled tubing is left in place within the wellbore for hours, and temperature traces along the entire stimulated interval are acquired and interpreted at surface. Although this method is marketed as being "real time" in the industry, it has two major disadvantages which hinder its effectiveness. First, the fiber is located inside the coiled tubing and does not have direct contact with the acid. Thus, its readings depend upon the heat transfer from the annulus acid through the coiled tubing wall, to the DTS fiber. Second, this is not actually a real time technique, since long periods of time, usually hours, are reported for acquiring time-dependent temperature traces. Indeed, after the acid is bullheaded, the DTS software could evaluate the temperature profile and recommend more stimulation needed in certain zones. Then a new diversion/acidizing treatment would have to be executed in order to inject more acid into the targeted zone(s).

In some instances, a DTS fiber is secured to the radial exterior of the completion. In these cases, the DTS fiber installation is permanent. But the arrangement is typically very costly to maintain and prone to failure. Additionally, it cannot be used in an open hole well that has not been completed.

In fracturing operations, a fracturing fluid, usually containing proppant, is injected into a wellbore at selected locations. At present, there is no reliable method for determining the flow rates for injected fracturing fluid at locations within the wellbore in real time.

SUMMARY OF THE INVENTION

The present invention relates to systems and methods for acquiring data in real time during operations wherein a work fluid is injected into portions of a wellbore and interpreting acquired data during or after the downhole operation in order to optimize injection. Exemplary operations of matrix acidizing and hydraulic fracturing are described. Methods in accordance with the present invention preferably use single point sensors to acquire temperature and pressure data without requiring the sensors to remain in a stationary position. In accordance with described methods, fluid flow rates are determined using detected pressure and temperature data. Mass, momentum and energy equations are used to determine the flow rates. In addition, the methods of the present invention allow calculation of reaction heat produced by injection of the work fluid. In particular, embodiments, the wellbore is divided into discrete zones and the equations are solved for each zone. Calculated temperatures are compared to measured temperatures. Calculated results for coefficients of friction closely approximate actual measured values.

In accordance with a first preferred embodiment of the invention, an acidizing arrangement is provided for acidizing a formation and includes a flow-through bottom hole assembly (BHA) which allows acid from surface to be distributed into the wellbore. An array of temperature and pressure sensors is carried by the BHA. Also in preferred embodiments, the BHA is run into the wellbore on coiled tubing. Further, temperature and pressure data can be transmitted from the BHA to surface via Telecoil or other cable arrangement. In contrast to many DTS systems which position a sensing fiber inside of a coiled tubing string, sensors of the present invention are preferably in direct contact with annular fluid.

In accordance with aspects of the invention, a section of the wellbore to be acidized is divided into discrete zones for flow simulation methods. The acidizing bottom hole assembly is then run into the wellbore until it reaches an acidizing location. During run-in, the geothermal temperature, reservoir/annulus pressure, and coiled tubing heat transfer coefficient are measured or calculated at or for each zone within the wellbore section. Following run in, a diverter fluid may be flowed through the bottom hole assembly to help isolate the injection area. A predetermined amount of acid is then injected into the wellbore and formation while the bottom hole assembly remains in place at the acidizing location.

After acid injection at the acidizing location is stopped, the bottom hole assembly is withdrawn from the wellbore. During withdrawal, temperature and pressure are again measured at locations along the wellbore.

Temperature and pressure data is acquired within each of the discrete zones of the wellbore. A mathematic model is constructed as mass, momentum and energy equations are then solved for each segment using the temperature and pressure data acquired by the sensors.

The flow rates of acid being injected into the formation along the injection zone are determined. The flow rates can be displayed in real time by the controller. If desired, an acidizing profile can be developed which is then compared to a planned acidizing profile.

In a second described embodiment, coiled tubing-based sensor arrangements are used to monitor operational parameters such as temperature and pressure during wellbore fracturing operations. A described fracturing arrangement includes a work string and a fracturing bottom hole assembly through which fracturing fluid and proppant can be injected. As the fracturing arrangement is run into the wellbore, single point sensors, preferably located on the fracturing bottom hole assembly, detect pressure and temperature at locations along the wellbore. Once the fracturing bottom hole assembly is located proximate a location within the wellbore wherein it is desired to inject fracturing fluid, movement of the fracturing arrangement is stopped. Thereafter, fracturing fluid with proppant is injected into the wellbore. The fracturing arrangement is then withdrawn from the wellbore and, as it is withdrawn, pressure and temperature is again detected at locations along the wellbore. Fluid flow rates are determined at each selected location along the wellbore. Users can therefore determine where the fracturing treatment is actually going.

The systems and methods of the present invention also have application to multistage stimulation treatments wherein both acidizing and hydraulic fracturing are conducted in separate stages, A first stimulation operation, i.e., acidizing, is conducted as temperature and pressure are monitored during run in and removal of the work string from the wellbore. A second stimulation operation, i.e., hydraulic fracturing, is conducted as temperature and pressure are monitored during run in and removal. As each of these first and second stimulation operations are conducted, as described above, fluid flow rates are calculated and modeled.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein:

FIG. 2 is an enlarged side, cross-sectional view of an exemplary bottom hole assembly which incorporates a plurality of sensors in accordance with the present invention.

FIG. 3 is an axial cross-section taken along lines 3-3 in FIG. 2.

FIG. 4 is a schematic cross-sectional drawing depicting the bottom hole assembly located proximate a location within a formation wherein it is desired to detect matrix acidizing parameters at a first time.

FIG. 5 is a schematic cross-sectional drawing depicting the bottom hole assembly located proximate a location within a formation wherein it is desired to detect matrix acidizing parameters at a subsequent second time.

DETAILED DESCRIPTION OF THE PREFERRED EMBODIMENTS

Figure 1:
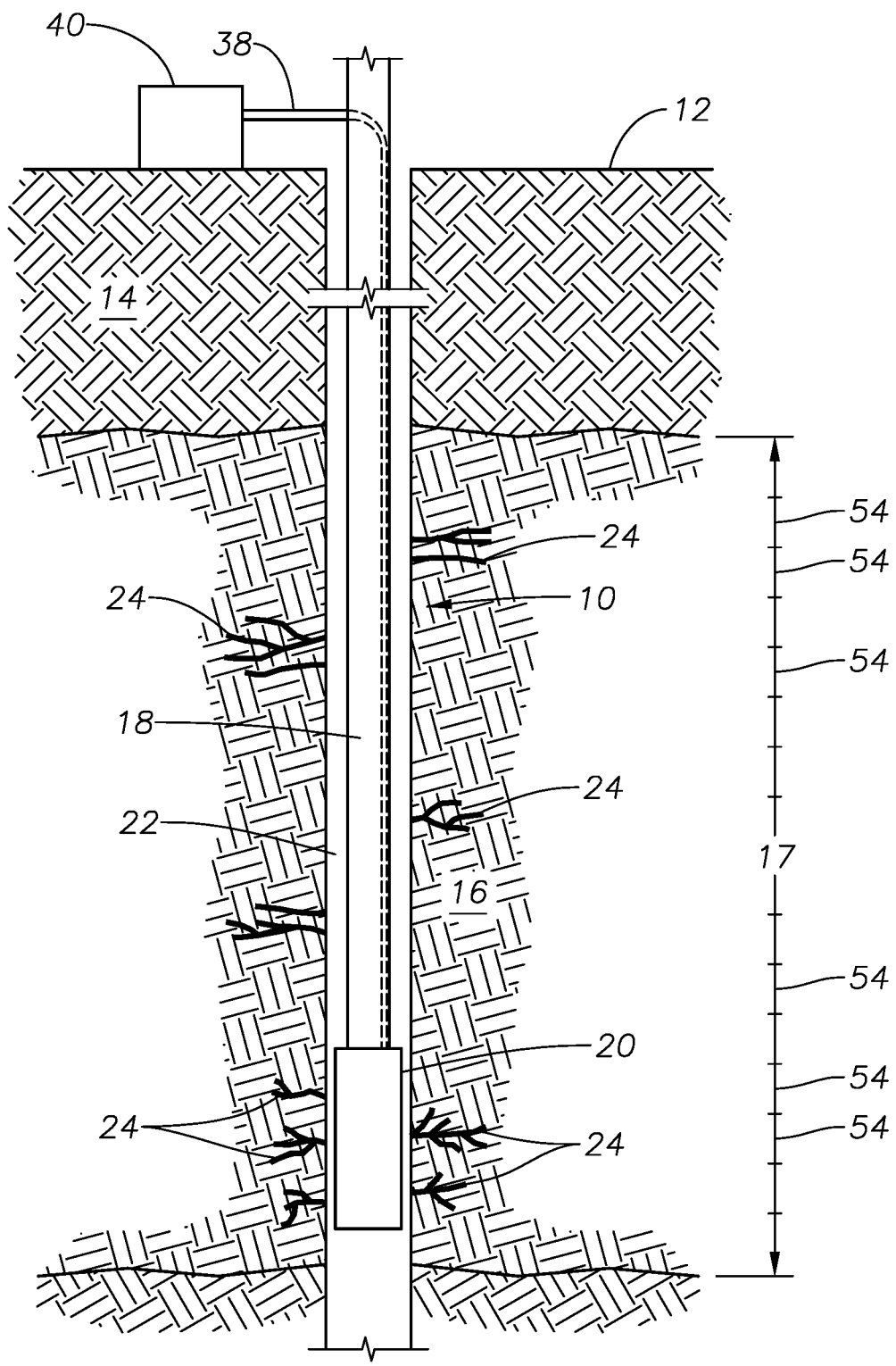
FIG. 1 is a side, cross-sectional view of an exemplary wellbore having a tool string therein for conducting matrix acidizing stimulation and monitoring in accordance with the present invention.

FIG. 1 illustrates an exemplary wellbore 10 which has been drilled from the surface 12 down through the earth 14 to a hydrocarbon-bearing formation 16 within which it is desired to conduct matrix acidizing. As is known, the injection of acid will cause the formation and/or lengthening and enlargement of wormholes in the surrounding formation 16, thereby increasing access to hydrocarbon fluid within the formation 16. A tool string 18 has been run into the wellbore 10 from the surface 12 and carries a bottom hole assembly 20 in the form of a matrix acidizing tool. The bottom hole assembly 20 tool is preferably a metal cylinder having temperature and pressure sensors on its outer surface and connected for signal transmission to the surface, as will be described. In a currently preferred embodiment, the tool string 18 is made up of coiled tubing, of a type known in the art, which can be injected into the wellbore 10. An annulus 22 is formed radially between the tool string 18/bottom hole assembly 20 and the inner wall of the wellbore 10. It is noted that, while FIG. 1 depicts a vertical wellbore 10, this is exemplary only. In fact, the systems and methods of the present invention are applicable to wellbore that are deviated, inclined or even horizontal.

FIGS. 2 and 3 illustrate an exemplary bottom hole assembly 20 in greater detail. The exemplary bottom hole assembly 20 includes a generally cylindrical tool body 26 which defines a central axial passage 28 along its length. A nozzle 30 is formed on the distal end of the tool body 26 to allow acid injected down the tool string 18 to enter the formation 16. It should be noted that the figures depict a simplified tool having only a single nozzle 30. In practice, the bottom hole assembly 20 might have multiple nozzles or openings that allow acid to be dispersed in multiple locations and in multiple directions.

Radial passages 32 are drilled through the tool body 26 from the central axial passage 28 to the radial exterior of the tool body 26. A sensor array 33 is provided proximate the lower end of the tool string 18 and preferably upon the tool body 26 of the bottom hole assembly 20. The sensor array 33 includes multiple sensors 34 which are divided into two sets of sensors 34a, 34b. The first set of sensors 34a is axially separated from the second set of sensors 34b along the length of the tool body 26 by a length ("x") (see FIG. 2). Each sensor 34 is preferably located at the radially outermost portion of each passage 32. In particularly preferred embodiments, the sensors 34 are transducers that are capable of detecting temperature and generating a signal indicative of the detected temperature. In alternative embodiments, one or more of the sensors 34 are capable of detecting pressure. It is currently preferred that sensors 34 be spaced angularly about the circumference of the tool body 22 in order to obtain sensed parameters from multiple radial directions around the tool body 22. In the depicted embodiment, the sensors 34 are located approximately 90 degrees apart from one another about the circumference of the tool body 22. In the depicted embodiment, there are eight sensors 34. However, there may be more or fewer than eight, as desired.

Electrical cables 36 extend from the sensors 34 to a conduit 38 that is disposed within the central passage 40 of the tool string 18. In a particularly preferred embodiment, the conduit 38 comprises a conductor known in the industry as tubewire, which can be disposed within the coiled tubing to provide a Telecoil conductive system for data/power. The term "tubewire", as used herein, refers to a tube which may or may not encapsulate a conductor or other communication means, such as, for example, the tubewire manufactured by Canada Tech Corporation of Calgary, Canada. In the alternative, the tubewire may encapsulate one or more fiber optic cables which are used to conduct signals generated by sensors 34 that are in the form of fiber optic sensors. The tubewire may consist of multiple tubes and may be concentric or may be coated on the outside with plastic or rubber. In alternative embodiments, the conduit 38 may be a fiber optic cable. In further alternative embodiments, the conduit 38 may comprise a wireless communication link.

The conduit 38 extends to surface-based signal processing equipment at the surface 12. FIG. 1 illustrates exemplary surface-based equipment to which the conduit 38 might be routed. The conduit 38 is operably interconnected with a signal processor 40 of known type that can analyze and in some cases, record and/or display representations of the sensed temperature and/or pressure parameters. Suitable signal processing software, of a type known in the art can be used to process, record and/or display signals received from the sensors 34. In the instance where the conduit 38 encases optic fibers rather than electrical conductors, the surface-based signal processor 40 includes a fiber optic signal processor. A typical fiber optic signal processor would include an optical time-domain reflectometer (OTDR) which is capable of transmitting optical pulses into the fibers and analyzing the light that is returned, reflected or scattered therein. Changes in an index of refraction in the optic fiber can define scatter or reflection points. The signal processor 40 can include signal processing software for generating a signal or data representative of the measured conditions.

In certain embodiments, a memory module could be operably associated with the bottom hole assembly 20 to store detected data. FIG. 2 depicts a memory module 37 which is operably associated with the conduit 38 and bottom hole assembly 20 to receive and store detected operational parameter data. The stored data can be retrieved once the bottom hole assembly 20 is removed from the wellbore 10.

In conjunction with the processing equipment 40, the first set of sensors 34a is operable to detect at least one matrix acidizing operational parameter at a first time while the second set of sensors 34b is operable to detect the same at least one matrix acidizing operational parameter at a second time that is after the first time. The difference between the first and second time is based upon the rate of movement of the sensor array 33 within the formation 16 relative to a particular point of interest. FIGS. 4 and 5 illustrate a bottom hole assembly 20 being moved within the wellbore 10 past a point 50 within the formation 16 at which it is desired to detect at least one matrix acidizing operational parameter. In FIG. 4, the first set of sensors 34a is located proximate the point 50. In this position, the sensors 34a detect a matrix acidizing operational parameter at the point 50. Thereafter, the tool string 18 is pulled upwardly in the direction of arrow 52 until the bottom hole assembly 20 is in the position shown in FIG. 5. FIG. 5 shows the second set of sensors 34b located proximate the point 50. In this position, the second set of sensors 34b will detect the same matrix acidizing operational parameter(s) as the first set of sensors 34a. The first set of sensors 34a detects the parameter(s) at a first time (t1) while the second set of sensors 34b detect the parameter(s) at a second time (t2). The rate of movement of the tool string 18 and bottom hole assembly 20 in direction 52 should be coordinated with the timing of detection of the operational parameter(s) by the two sets of sensors 34a, 34b. This coordination can be conducted, for example, by the processing equipment 40 is such equipment 40 is provided with control over the rate of movement. The processing equipment 40 will compare the operational parameters(s) detected by the first set of sensors 34a to the operational parameters(s) detected by the second set of sensors 34b. Thus, it can be determined whether the operational parameter is increasing, decreasing or neither. This manner of measuring operational parameters can be repeated for multiple points or locations 50 along the formation interval 17. Although only a single location 50 is shown in FIGS. 4 and 5, it will be understood by those of skill in the art that there may be a large number of such points within the formation interval 17. Additionally, more than two sets of sensors might be employed to provide further detail about the measured operational parameter.

Figure 6:
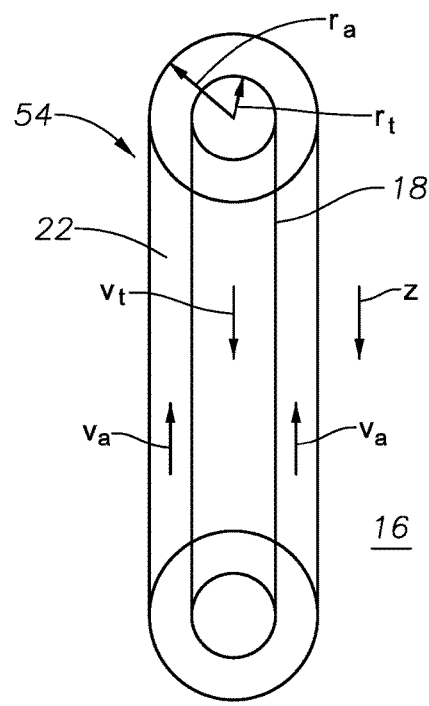
FIG. 6 is a graphical representation of a section of coiled tubing and annulus.

The use of single point sensors 34a, 34b with the bottom hole assembly 20 allows for real-time temperature and pressure data acquisition and interpretation as a matrix acidizing operation is performed. The methods of operation are primarily designed for use in open-hole wells, but might also be used with cased holes. The open hole section of the wellbore interval 17 that is to be acidized is divided into zones depending upon the reservoir properties and production target. Exemplary discrete zones 54 are depicted in FIG. 1. Zones 54 may have the same length or be of varying lengths. Dividing the wellbore interval 17 into zones, or segments, 54 allows the tubing 18, annulus 22 and surrounding formation 16 to be treated as discrete segments for mathematical modeling. FIG. 6 illustrates an exemplary single zone 54 with segments shown of the tubing 18, annulus 22 and surrounding formation 16. In FIG. 6, $r_t$ and $r_a$ are the tubing 18 and annulus 22 radii, respectively. These values are known. The pumping velocity or rate, $v_t$ is also known. A mathematical model is constructed with a system of 3N+3 conservation equations (i.e., mass, momentum and energy), and 3N+3 variables (i.e., flow rate, temperature, pressure) where N+1 is the number of tubing segments. Downhole temperature modeling for coiled tubing operations using such conservation equations is described in Livescu et al., SPE Paper 168299, "Analytical Downhole Temperature Model for Coiled Tubing Operations," (2014) which is hereby incorporated by reference in its entirety. As the bottom hole assembly 20 is moved along the zones 54, $p_t$, $p_a$, $T_t$ and $T_a$ are measured. Then, the mathematical model provides $v_a$ and $v_f$ along the segments. Alternatively, the bottom hole assembly 20 may be moved after pumping acid along several zones 54. Right after stopping pumping of acid, the annulus 22 temperature and tubing 18 temperature are measured along that interval and then the mathematical model is used to convert these data into acid velocities/rates. It is important to record the annulus pressure and temperature before the warm-up period (i.e., during run-in), and this is a significant difference between methods in accordance with the present invention and DTS system methods. Because the sensors 34a, 34b are recording single point pressure and temperature data, there is no need to wait for the reaction heat (due to acid dissolving rock) to return through conduction to the wellbore 10. Instead, we assume that the annulus temperature is changing as acid goes into formation. These changes happen as long as acid is pumped. After acid pumping is stopped, annulus temperature slowly warms back up to geothermal temperature.

After discretizing the well into zones 54, including tubing 18, annulus 22 and formation 16, into discrete zones 54, the fluid and flow properties are averaged for all of the zones 54. Regarding the well zones 54, for phase p, the density $\rho_p$, the viscosity $\mu_p$, the holdup $\alpha_p$, the mixture velocity $v_m$, the pressure p, and the temperature T are averaged for each zone 54. Thermodynamic equilibrium is assumed between phases such that all phases have similar pressure and temperature.

According to an exemplary method of operation, the tool string 18 and bottom hole assembly 20 are disposed into the wellbore 10 and advanced until the bottom hole assembly 20 is proximate the formation 16 into which it is desired to perform matrix acidizing. During run into hole, the geothermal temperature, reservoir, annulus pressure, coiled tubing heat transfer coefficient and other properties can be measured or calculated at each location 50 along the well injection interval 17. Acid is then injected into the desired location within the interval 17 by pumping acid down the tool string 18 which will then flow through the nozzle 30 of the bottom hole assembly 20 and into the wormholes 24 of the formation 16.

Prior to acidizing, temperature and/or pressure is detected by the sensors 34 and provided to the processing equipment 40 at surface 12. During acidizing, the bottom hole assembly 20 is not moved from one location to another within the formation interval 17.

After the acid injection is stopped at time ($t_s$), the work string 18 is pulled out of the hole, preferably at a constant speed that can be calculated depending on the time difference ($t_f$-$t_s$) and the length of the stimulated zone along the well. Thus, the time $t_f$ may be the time that the matrix acidizing bottom hole assembly 20 has traveled the entire well interval of interest. The number of sensors 34 will be dependent on the accuracy of the data acquisition. For instance, a single temperature sensor may not be sufficient for temperature drop data interpretation, as any temperature difference recorded might be due to either axial flow (flow inside the annulus 22) or radial flow (flow between the wellbore 10 and a wormhole 24). However, multiple sensors 34 could accurately identify of a recorded temperature variation is due to axial flow or radial flow. At least two temperature sensors 34 should be installed sufficiently far away from each other such that they capture temperature differences due to radial acid flow. In particular embodiments, the minimum distance between two temperature sensors 34 is greater than the radial diameter of the wormholes. Thus, it is preferred that the sensors 34 are spaced apart from each other on the tool body 22 by a distance that is greater than the diameter of the wormholes 24. Theoretical calculations show that the minimum distance between two temperature sensors 34 should be between 4 and 20 meters (13-66 feet), depending upon the reservoir properties (porosity, permeability, wormhole size and shape, geothermal gradient, thermal conductivity, etc.) and well details (shape, dimensions, completion type, etc.). The method could be refined by adding temperature sensors between the two end sensors. Adding more temperature sensors in between increases the accuracy of temperature variation measurement. In addition to the temperature sensors, other sensor types could be used. For instance, pressure sensors could also be installed. Both temperature and pressure measurements are useful in accurately evaluating the matrix acidizing performance when they are coupled with a mathematical model that solves the classical energy flow equation inside the well:

$$\frac{\partial}{\partial t}\left[\rho\left(u+\frac{1}{2}v^2\right)\right] + \frac{\partial}{\partial z}\left[\rho v\left(h+\frac{1}{2}v^2\right)\right] = Q$$

where $\rho$ is acid density, t and z are time and the curvilinear coordinated along the well path, v is acid velocity, $u=c_p(T-T_{ref})$ and $h=u+p/\rho$ are the specific internal energy and enthalpy, respectively, $c_p$ is the specific heat defined at reference temperature $T_{ref}$, and T and p are acid temperature and pressure. Note also that Q is the term that includes all other heat exchange effects, such as heat loss due to acid flowing into/from formation.

As the bottom hole assembly 20 is pulled out of the wellbore 10, temperature and pressure data is acquired along the injection zone formation interval 17. Using this data as input in the mathematical model, the acid flow rate into the formation is calculated along the formation interval 17 by the processing equipment 40. The calculated flow rate is used by the processing equipment 40, or by a user, to evaluate acidizing performance and decide in real time how the acidizing job could be optimized. For example, if the acid did not create enough wormholes or if there is a thief zone, the bottom hole assembly 20 could be moved back to a particular location 50 within the formation interval 17 for additional acid injection at that location 50.

Mathematical modeling is preferably performed by the processing equipment 40 to determine acid fluid flow rates and reaction heat (i.e., heat created by reaction between the acid and formation). The values are determined using modeling which considers the formation interval 17 as divided into discrete zones 54. This modeling permits each zone 54 to be treated as one-dimensional elements (in the axial direction) for both tubing 18 and annulus 22 flows and radial flow for the formation 16. The radial flow between tubing 18 and annulus 22 is accounted for through nozzle flow pressure drop relationships. The heat transfer between tubing 18, annulus 22 and formation 16 are accounted for via unified heat transfer coefficients which, for example, take into account the thermal properties of the media between tubing 18 and annulus 22 and between annulus 22 and formation 16, respectively. Other heat transfer relationships should be readily implemented. The reaction heat is implemented in the energy equation for formation 16. The flow is considered to be homogeneous, i.e., all phases of flow with the same velocity (slip effects are ignored here for the purpose of simplicity; addition of mechanistic models or a drift-flux model would add an extra degree of complexity, but they could be implemented as well).

Figure 7:
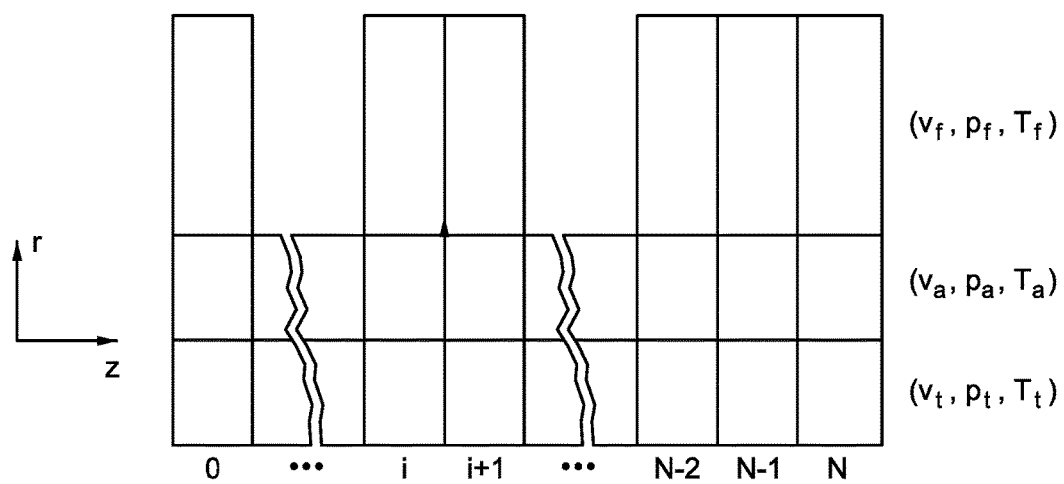
FIG. 7 is a graph illustrating discretizing of the coiled tubing, annulus and formation.

The wellbore formation interval 17 is presented as a one-dimensional two-row model, as illustrated in FIG. 7. In the depicted instance, a coiled tubing section has been discretized into N+1 segments, numbered from 0 to N. Additionally, the annular space is discretized in N+1 segments of similar length. The nearby formation is discretized into N=1 cells. For each segment/cell, the physical properties are averaged in the center. Thus, each coiled tubing segment is defined by the fluid velocity ($v_t$), fluid pressure ($p_t$) and temperature ($T_t$). Each annular segment is defined by the fluid velocity ($v_a$), fluid pressure ($p_a$) and temperature ($T_a$). Each formation cell is defined by fluid velocity ($v_f$), fluid pressure ($p_f$) and temperature ($T_f$).

Figure 8:
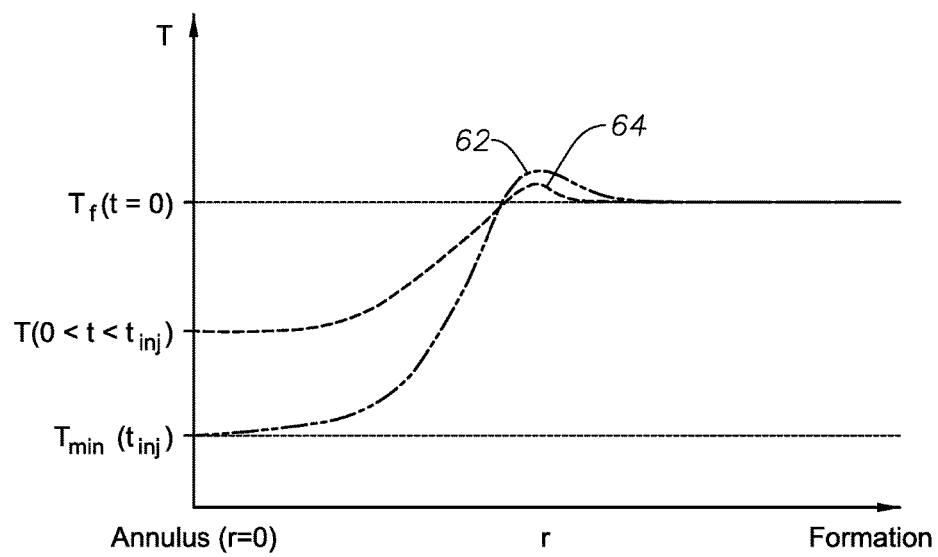
FIG. 8 is a graph illustrating formation temperature evolution in time at a fixed location during acid injection.

FIG. 8 illustrates the variation of formation temperature in time, as acid is injected into the formation 16. The x axis represents the distance away from the wellbore 10 (r=0 corresponds to the wellbore wall, i.e., where the acid leaves the annulus 22 and flows into the formation 16). The y axis is temperature. Initially, before the acid is injected into the formation 16, the formation temperature is the same everywhere, $T_f$. As acid is injected into the formation 16, the annulus temperature starts decreasing. At the end of the injecting time, $t_{inj}$, the annulus temperature reached the minimum value $T_{min}$. During acid injection, the formation temperature increases from the annulus temperature at r=0 to the formation temperature $T_f$ away from the wellbore 10 where no acid flows. At the acid front, there is a reaction between the acid and the formation rock which releases reaction heat. As a result, the formation temperature increases from the annulus temperature to a maximum (where the acid front is), and then decreases to $T_f$. The transition bumps 62, 64 correspond to temperature increases due to the reaction heat at the acid front travelling into the formation 16.

Figure 9:
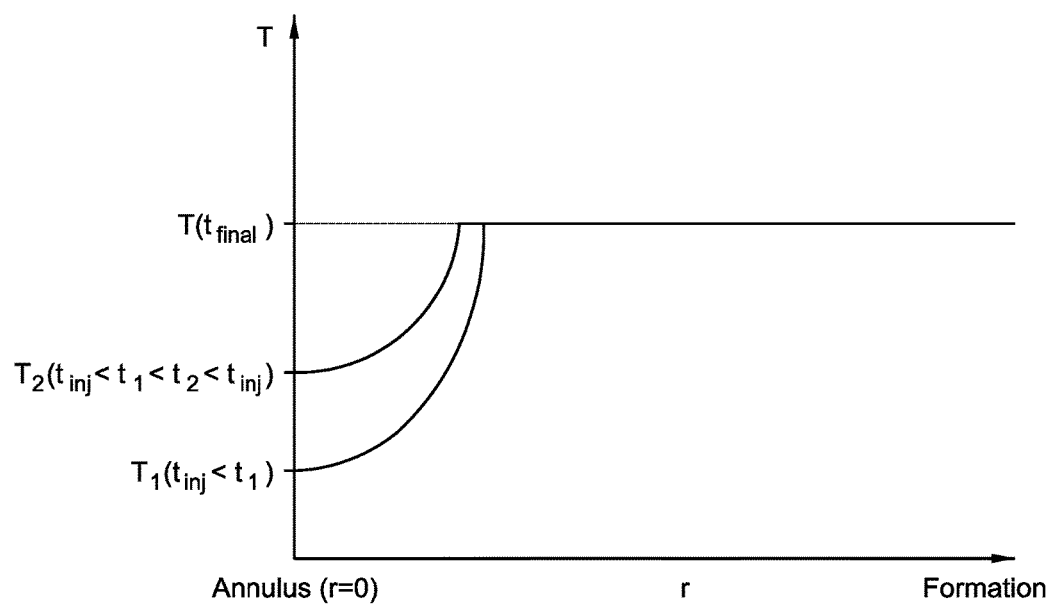
FIG. 9 is a graph illustrating formation temperature evolution in time at a fixed location after acid injection has stopped.

FIG. 9 illustrates formation temperature evolution over time at a fixed annulus location after acid injection has ended. The annulus temperature is shown to increase from the minimum value at the end of injection to the geothermal temperature ($t_{final}$) after a sufficiently long time. $T_{final}$ from FIG. 9 is the same as $T_f$(t=0) from FIG. 8. The appearance of formation temperature curves in FIGS. 8 and 9 is different as the heat transfer mechanisms are different: during acidizing in FIG. 8, heat is dissipated mostly by convection (and reaction at the acid front) while during the warm-up in FIG. 9, heat is generated by conduction.

As partially illustrated by FIGS. 8 and 9, an exemplary method of operation for obtaining real time pressure and temperature data includes the following steps. First, the tool string 18 and bottom hole assembly 20 are run into the wellbore 10 to a desired location within the formation interval 17 without injecting acid. The sensors 34a, 34b obtain the geothermal temperature and the z-dependent heat transfer coefficient between the tubing and annulus. The heat-transfer coefficient is pre-calculated based upon the materials making up the work string/coiled tubing 18, well wall and the formation 16. This step is assumed to have no flow in both the work string/tubing 18 and annulus 22. Next, acid is injected through the bottom hole assembly 20 and into the annulus 22. From there, some of the acid will flow radially out into the formation 16 and the rest of it will flow back up through the annulus 22 toward surface. After a certain distance from the bottom hole assembly 20, all acid will flow into the formation 16. When injecting acid, with the bottom hole assembly 20 unmoved, the temperature of locations in the formation 16 where acid is flowing into will decrease with time. Eventually, it will reach a minimum value that depends upon the injection time. If the injection time is long enough, the minimum temperature will be close to the acid temperature at surface. The acid will flow into the formation 16 and react with rock within the formation 16, generating reaction heat. This reaction heat will produce an increase of temperature next to the acid front. This temperature increase cannot be measured by the BHA sensors because the acid front is travelling away from the wellbore 10, as FIG. 8 reflects. After the acid injection is stopped, the formation temperature begins increasing back due to the difference between geothermal temperature and the annulus temperature, as illustrated in FIG. 9. Should a greater amount of acid flow into formation 16 at a particular location, the acid front will travel further, and it will take longer for the annulus 22 temperature to increase to the geothermal temperature.

After the acid injection is stopped, the bottom hole assembly 20 is moved along the formation interval 17 as annulus temperature and pressure data are acquired. Knowing the time and location 50 for the data collected, the difference between the current temperature and geothermal temperatures as well as the difference between the current temperature, the initial temperature and pressure values are used to calculate the radial flow into formation. The bottom hole assembly 20 preferably has two (or more) single-point temperature and pressure sensors 34a, 34b. As the bottom hole assembly 20 is pulled out of the wellbore 10 after acid injection is stopped, the data from the sensors 34a, 34b are acquired as follows: for the same location 50 at different times, different readings are taken at several times (when each sensor set 34a, 34b passes in front of the location 50). Thus, temperature and pressure changes in time can be measured for different locations 50 at the same time. The readings at different locations will be varied if, for example, sensor sets 34a, 34b pass in front of a thief zone or a wormhole which would have a lower temperature than its surrounding locations.

Figure 10:
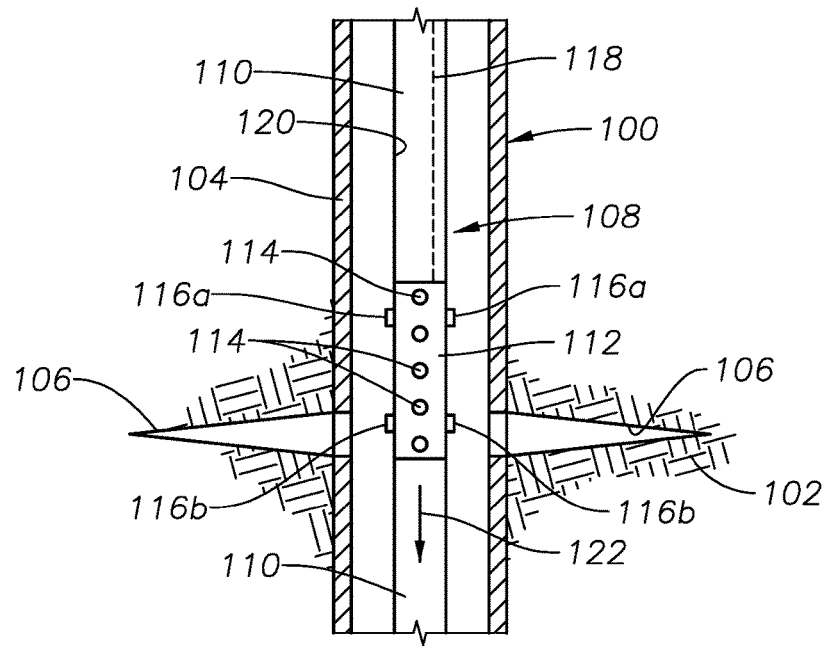
FIG. 10 is a side, cross-sectional view of wellbore with a hydraulic fracturing arrangement being run in and having sensors sets to measure pressure and temperature.
Figure 11:
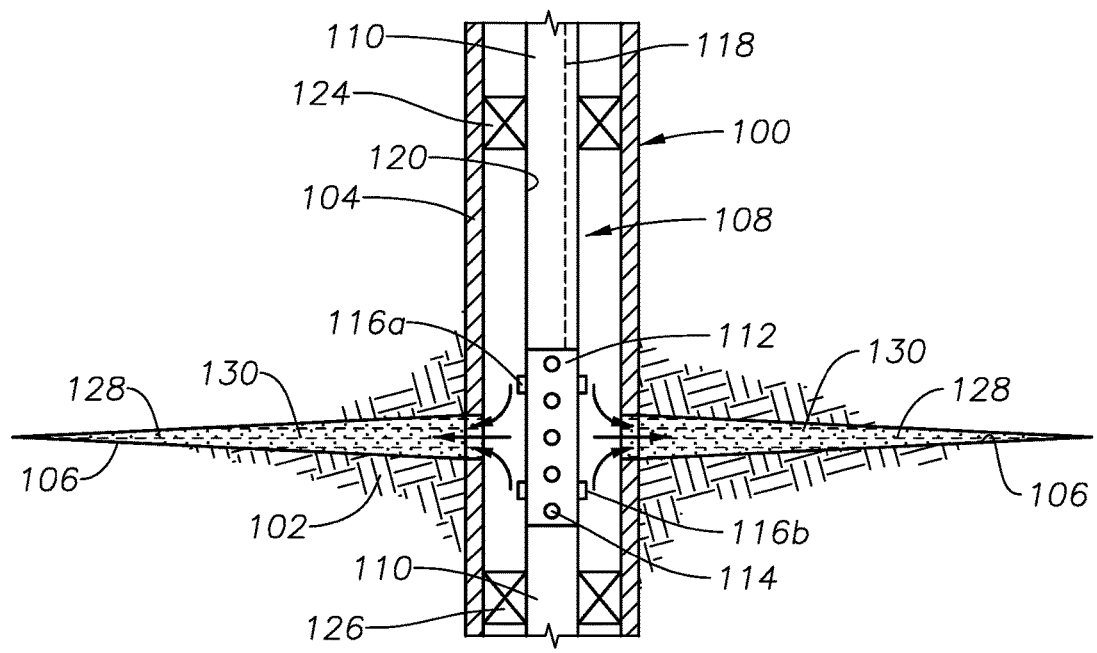
FIG. 11 is a side, cross-sectional view of the hydraulic fracturing arrangement shown in FIG. 10 now with fracturing fluid being injected.
Figure 12:
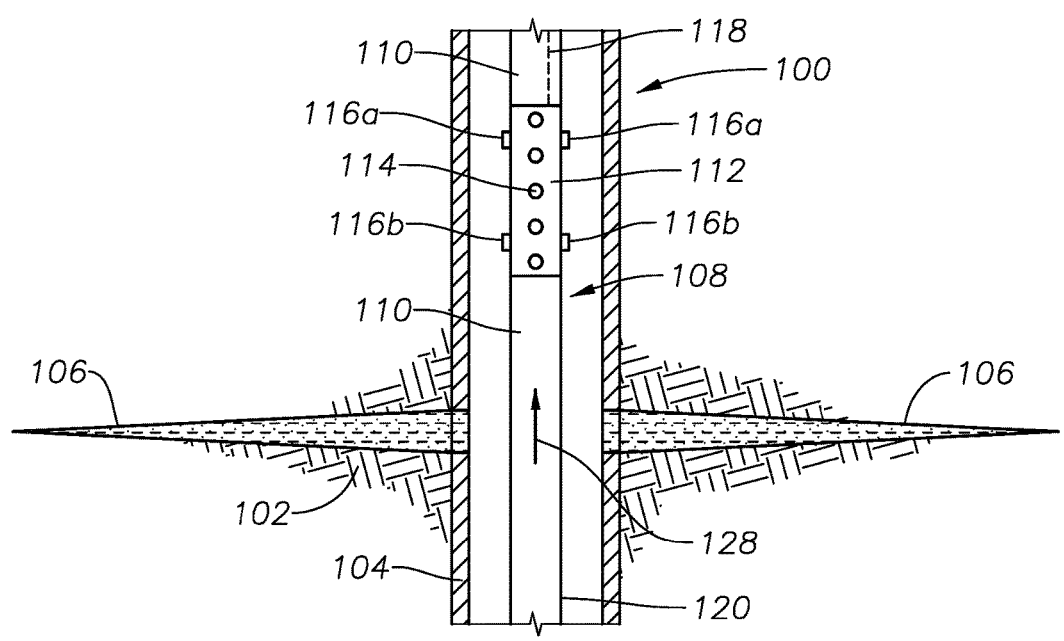
FIG. 12 is a side, cross-sectional view of the hydraulic fracturing arrangement shown in FIGS. 10-11 now with the fracturing arrangement being moved following injection.

FIGS. 10-12 illustrate an exemplary wellbore 100 which has been drilled through the earth to a hydrocarbon-bearing formation 102. The wellbore 100 is lined with casing 104. Perforations 106 extend through the casing 104 and into the surrounding formation 102. Although only a single set of perforations 106 is shown in FIGS. 10-12, it should be understood that this is illustrative and that there is typically more than one set of perforations 106 present.

A hydraulic fracturing arrangement 108 is shown disposed within the wellbore 100 and includes a hydraulic fracturing work string 110. In preferred embodiments, the hydraulic fracturing work string 110 is coiled tubing. A fracturing bottom hole assembly 112 is affixed to the lower end of the hydraulic fracturing work string 110. The fracturing bottom hole assembly 112 has openings 114 through which fracturing fluid containing proppant can be flowed.

Single point sensor sets 116a, 116b are located on the exterior surface of the fracturing bottom hole assembly 112. The sensor sets 116a, 116b may be constructed and operate in the same manner as the sensor sets 34*a*, 34*b* described previously. The sensor sets 116*a*, 116*b* are operably interconnected with a conduit 118 that is disposed within the central passage 120 of the work string 110. In a particularly preferred embodiment, the conduit 118 comprises tubewire. Although not shown in FIGS. 10-12, those of skill in the art will understand that there will be processing equipment at surface similar to the processing equipment 40 described earlier and which is capable of receiving data from the sensors 116*a*, 116*b* via the conduit 118 and performing mass, momentum and energy equations calculations. In accordance with preferred embodiments of the invention, an interval of the wellbore 100 is divided into discrete zones, as described previously with respect to wellbore 10, and the method of mathematical modeling is similar.

In operation, the hydraulic fracturing arrangement 108 is run into the wellbore 100, in the direction indicated by arrow 122 in FIG. 10, until the fracturing bottom hole assembly 112 is proximate the perforations 106. During the run-in, sensors 116*a*, 116*b* will sense temperature and pressure at locations along the wellbore 100. Once the fracturing bottom hole assembly 112 is located proximate the perforations 106, movement of the hydraulic fracturing arrangement 108 is stopped. Packers 124, 126 are preferably set against the casing 104 to help isolate the area to be fractured. Work fluid 128 containing fracturing proppant 130 is injected under pressure toward the perforations 106 causing that portion of the formation 102 which has been perforated to fracture. Once fracturing treatment has been completed, the packers 124, 126 are unset and the hydraulic fracturing arrangement 108 is withdrawn, as indicated by arrow 128 in FIG. 12. During withdrawal, the sensors 116*a*, 116*b* will again sense temperature and pressure at locations along the wellbore 100.

Using the pressure and temperature data that was sensed during run in and the data sensed as the hydraulic fracturing arrangement 108 is withdrawn, fluid flow rates are calculated at surface. The calculated flow rates are considered to be real time flow rates of work fluid into formation. If necessary, the fracturing operation can then be adjusted. An operator can optimize the fluid flow rate and schedule based upon the determined fluid flow rate. For example, if the calculated flow rates at particular location indicates that there has not been sufficient injection of fracturing fluid 128 and proppant 130, the fracturing bottom hole assembly 112 can be moved back to that location for further injection of fracturing fluid 128 and proppant 130 according to a determined schedule and by pumping fluid at a fluid flow rate that is calculated to effectively inject the fracturing fluid 128.

According to additional aspects of the present invention, data is acquired and interpreted for multistage stimulation treatments which include both acidizing and hydraulic fracturing operations. In accordance with an exemplary method, a first stimulation operation, i.e., acidizing, is conducted as temperature and pressure are monitored during run in and removal of the work string from the wellbore. Thereafter, a second stimulation operation, i.e., hydraulic fracturing, is conducted as temperature and pressure are monitored during run in and removal. As each of these first and second stimulation operations are conducted, as described above, fluid flow rates are calculated and modeled. A user can adjust and optimize each stimulation operation as needed.

Those of skill in the art will understand that the invention provides methods for acquiring and interpreting data for downhole operations wherein a work string is run into a wellbore in order to inject a work fluid into the wellbore. In embodiments described herein, the work string may be an acidizing arrangement (i.e., 18, 20) or a hydraulic fracturing arrangement 108. Exemplary work fluids include acid treatments and fracturing fluids. Described methods include the steps of running the work string into the wellbore and measuring temperature and pressure wellbore parameters along a desired interval within the wellbore as the work string is run into the wellbore. The work fluid is then injected into a desired location within the wellbore as the work string is not moved. Thereafter, the work string is removed from the wellbore, and, as the work string is removed, pressure and temperature is again measured along the desired interval. Mass, momentum and energy equations are used to calculate fluid flow rate from the pressure and temperature readings for individual points along the wellbore and provide real-time information to uses at surface. Adjustments can then be made in the injection operation. The calculations of flow rates from temperature and pressure readings during run-in, and again, during withdrawal, allows the determination of flow rate information which accounts for reaction heat (i.e., heat generated from reaction between work fluid and the formation) which cannot be measured directly.

Those of skill in the art will recognize that numerous modifications and changes may be made to the exemplary designs and embodiments described herein and that the invention is limited only by the claims that follow and any equivalents thereof.

What is claimed is:

1. A method of acquiring and interpreting operating parameter data during an operation to inject a work fluid into a wellbore, the method comprising the steps of:
    running a work string into a wellbore, the work string having a bottom hole assembly with a radially exterior surface to inject a work fluid into a portion of the wellbore and at least one sensor carried on the radial exterior surface of the bottom hole assembly to detect temperature and pressure at locations along the wellbore;
    measuring temperature and pressure with the at least one sensor at the locations along the wellbore during the time the work string is run into the wellbore;
    injecting a work fluid at a predetermined location in the wellbore;
    removing the work string from the wellbore;
    measuring temperature and pressure at the locations along the wellbore with the at least one sensor during the time the work string is removed from the wellbore; and
    determining fluid flow rate into the formation based upon measured temperature and pressure.

2. The method of claim 1 wherein the work string is coiled tubing and the work fluid comprises acid.

3. The method of claim 1 wherein the work fluid comprises fracturing fluid containing proppant.

4. The method of claim 1 wherein the step of determining fluid flow rate into the formation further comprises calculating a real-time fluid flow rate into formation based upon measured single-point pressure and temperature data.

5. The method of claim 4 wherein the real-time fluid flow rate comprises a rate of acid flow into formation from acidizing.

6. The method of claim 4 wherein the real-time fluid flow rate comprises a rate of fracturing fluid flow into formation from hydraulic fracturing.

7. The method of claim 4 wherein the operation to inject a work fluid into a wellbore comprises a multistage stimulation treatment which includes acidizing and hydraulic fracturing.

8. The method of claim 1 further comprising the step of optimizing fluid flow rate and schedule based upon the determined fluid flow rate.

9. The method of claim 1 wherein the step of determining fluid flow rate into the formation further comprises:
    transmitting a signal representative of measured pressure and temperature to a signal processor which is programmed to determine fluid flow rate from measured temperature and pressure; and
    calculating said fluid flow rate using said signal processor.

10. The method of claim 9 wherein the step of transmitting a signal further comprises transmitting the signal from the bottom hole assembly to the signal processor via a conduit, the conduit being from the group consisting of: Telecoil or an optic fiber.

11. The method of claim 9 wherein the step of transmitting a signal further comprises transmitting the signal from the bottom hole assembly to the signal processor via a wireless communication link.

12. The method of claim 1 further comprising the step of storing measured temperature and pressure within a memory module.

13. A method of acquiring and interpreting operating parameter data during an operation to inject a work fluid into a wellbore, the method comprising the steps of:
    running a work string into a wellbore, the work string having a bottom hole assembly to inject a work fluid into a portion of the wellbore and at least one sensor carried on a radially exterior surface of the bottom hole assembly to detect temperature and pressure at locations along the wellbore;
    measuring temperature and pressure at the locations along the wellbore with the at least one sensor during the time the work string is run into the wellbore;
    injecting a work fluid at a predetermined location in the wellbore;
    removing the work string from the wellbore;
    measuring temperature and pressure at the locations along the wellbore with the at least one sensor during the time the work string is removed from the wellbore; and
    determining fluid flow rate into the formation based upon measured temperature and pressure wherein a real-time fluid flow rate into formation is calculated based upon measured single-point pressure and temperature data.

14. The method of claim 13 wherein the work string is coiled tubing and the work fluid comprises acid.

15. The method of claim 13 wherein the work fluid comprises fracturing fluid containing proppant.

16. The method of claim 13 wherein the operation to inject a work fluid into a wellbore comprises a multistage stimulation treatment which includes acidizing and hydraulic fracturing.

17. The method of claim 13 wherein the step of determining fluid flow rate into the formation further comprises:
    transmitting a signal representative of measured pressure and temperature to a signal processor which is programmed to determine fluid flow rate from measured temperature and pressure; and
    calculating said fluid flow rate using said signal processor.

18. The method of claim 17 wherein the step of transmitting a signal further comprises transmitting the signal from the bottom hole assembly to the signal processor via a conduit, the conduit being from the group consisting of: Telecoil or an optic fiber.

19. The method of claim 17 wherein the step of transmitting a signal further comprises transmitting the signal from the bottom hole assembly to the signal processor via a wireless communication link.

* * * * *